US009838811B2

(12) United States Patent
Pelosi

(10) Patent No.: US 9,838,811 B2
(45) Date of Patent: Dec. 5, 2017

(54) ELECTRONIC DEVICES AND ACCESSORIES WITH MEDIA STREAMING CONTROL FEATURES

(71) Applicant: Apple Inc., Cupertino, CA (US)

(72) Inventor: Alessandro Pelosi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/285,987

(22) Filed: Oct. 5, 2016

(65) Prior Publication Data

US 2017/0026765 A1 Jan. 26, 2017

Related U.S. Application Data

(62) Division of application No. 13/689,617, filed on Nov. 29, 2012, now abandoned.

(51) Int. Cl.

| | |
|---|---|
| ***H04R 1/10*** | (2006.01) |
| ***H04R 29/00*** | (2006.01) |
| ***G06F 3/16*** | (2006.01) |

(52) U.S. Cl.

CPC .......... *H04R 29/001* (2013.01); *G06F 3/165* (2013.01); *H04R 1/1008* (2013.01); (Continued)

(58) Field of Classification Search

CPC . H04R 1/1041; H04R 1/1091; H04M 1/6058; G06Q 30/0272

See application file for complete search history.

(56) References Cited

U.S. PATENT DOCUMENTS

| | | | |
|---|---|---|---|
| 3,794,779 | A | 2/1974 | Greuzerd et al. |
| 3,796,840 | A | 3/1974 | Ohta |

(Continued)

FOREIGN PATENT DOCUMENTS

| | | | |
|---|---|---|---|
| JP | 05062290 A * | 3/1993 | |
| JP | 10028169 | 1/1998 | |
| WO | 2011146659 | 11/2011 | |

OTHER PUBLICATIONS

Common drain, Wikipedia, accessed Jan. 8, 2017.*

(Continued)

*Primary Examiner* — Duc Nguyen
*Assistant Examiner* — Kile Blair
(74) *Attorney, Agent, or Firm* — Treyz Law Group, P.C.; Kendall W. Abbasi; Zachary D. Hadd

(57) ABSTRACT

An electronic device may play audio content to a user through a pair of earphones. The audio content may be content that is stored locally on the electronic device or may be streaming content that is provided by an online service. Control circuitry in the electronic device may monitor ear presence sensor structures in the earphones to determine whether the earphones are present in the ears of the user. In response to determining that the earphones have been removed from the ears of the user, the control circuitry may communicate with the online service provider. Communicating with the online service provider may include sending media streaming control commands to the online service provider. The media streaming control commands may, for example, include media streaming pause commands that instruct the online service provider to pause the audio content in response to the earphones being removed from the ears of the user.

18 Claims, 8 Drawing Sheets

(52) U.S. Cl.
CPC ......... *H04R 1/1016* (2013.01); *H04R 1/1041* (2013.01); *H04R 1/1091* (2013.01)

(56) References Cited

U.S. PATENT DOCUMENTS

| | | | |
|---|---|---|---|
| 5,144,678 | A | 9/1992 | Lenz |
| 5,337,353 | A | 8/1994 | Boie et al. |
| 5,729,604 | A | 3/1998 | Van Schyndel |
| 5,793,980 | A | 8/1998 | Glaser |
| 5,937,070 | A | 8/1999 | Todter et al. |
| 6,118,878 | A | 9/2000 | Jones |
| 6,614,912 | B1 | 9/2003 | Yamada et al. |
| 6,817,440 | B1 | 11/2004 | Kim |
| 7,069,018 | B1 | 6/2006 | Granstam et al. |
| 7,925,029 | B2 | 4/2011 | Hollemans et al. |
| 8,019,096 | B2 | 9/2011 | Sander et al. |
| 8,199,956 | B2 | 6/2012 | Haartsen et al. |
| 8,238,590 | B2 | 8/2012 | Burge |
| 8,428,053 | B2 | 4/2013 | Kannappan |
| 8,521,239 | B2 | 8/2013 | Hosoi et al. |
| 9,344,792 | B2 | 5/2016 | Rundle |
| 2004/0138723 | A1 | 7/2004 | Malick et al. |
| 2005/0170859 | A1 | 8/2005 | Koike et al. |
| 2005/0250553 | A1 | 11/2005 | Lim |
| 2006/0013079 | A1 | 1/2006 | Rekimoto |
| 2006/0233413 | A1 | 10/2006 | Nam |
| 2006/0256133 | A1 | 11/2006 | Rosenberg |
| 2007/0076897 | A1 | 4/2007 | Philipp |
| 2007/0121959 | A1 | 5/2007 | Philipp |
| 2007/0169615 | A1 | 7/2007 | Chidlaw et al. |
| 2007/0297618 | A1 | 12/2007 | Nurmi et al. |
| 2008/0157991 | A1 | 7/2008 | Raghunath et al. |
| 2008/0158000 | A1 | 7/2008 | Mattrazzo |
| 2008/0220831 | A1 | 9/2008 | Alameh et al. |
| 2008/0292126 | A1* | 11/2008 | Sacha .................... H04R 25/02 381/330 |
| 2008/0303947 | A1 | 12/2008 | Ohnishi et al. |
| 2009/0112696 | A1 | 4/2009 | Jung et al. |
| 2009/0131124 | A1 | 5/2009 | Bibaud et al. |
| 2009/0285408 | A1 | 11/2009 | Kimura |
| 2010/0020998 | A1 | 1/2010 | Brown et al. |
| 2010/0022283 | A1 | 1/2010 | Terlizzi |
| 2010/0128887 | A1 | 5/2010 | Lee et al. |
| 2010/0183175 | A1 | 7/2010 | Chen et al. |
| 2010/0197360 | A1 | 8/2010 | Namgoong et al. |
| 2010/0310087 | A1 | 12/2010 | Ishida |
| 2010/0310097 | A1 | 12/2010 | Chang |
| 2011/0007908 | A1* | 1/2011 | Rosener ............... H04R 1/1041 381/74 |
| 2011/0021182 | A1 | 1/2011 | Huan |
| 2011/0116643 | A1 | 5/2011 | Tiscareno et al. |
| 2011/0144779 | A1 | 6/2011 | Janse et al. |
| 2011/0187868 | A1 | 8/2011 | Chang et al. |
| 2011/0196519 | A1 | 8/2011 | Khoury et al. |
| 2011/0286615 | A1 | 11/2011 | Olodort et al. |
| 2012/0086551 | A1 | 4/2012 | Lowe et al. |
| 2012/0114154 | A1 | 5/2012 | Abrahamasson |
| 2012/0207317 | A1 | 8/2012 | Abdollahzadeh Milani et al. |
| 2012/0230699 | A1 | 9/2012 | Burnett |
| 2012/0244917 | A1 | 9/2012 | Hosoi |
| 2013/0038458 | A1 | 2/2013 | Toivola |
| 2013/0075595 | A1 | 3/2013 | Ruh |
| 2013/0083933 | A1 | 4/2013 | Aase |
| 2013/0094659 | A1 | 4/2013 | Liu |
| 2013/0121494 | A1 | 5/2013 | Johnston |
| 2013/0163783 | A1 | 6/2013 | Burlingame |
| 2013/0236027 | A1 | 9/2013 | Tao |
| 2014/0016803 | A1 | 1/2014 | Puskarich |
| 2014/0114917 | A1 | 4/2014 | Karlsson |
| 2014/0146979 | A1 | 5/2014 | Puskarich |

OTHER PUBLICATIONS

Acker, et al., "Smart Audio Output with Presence Sensors: Enabling mode switching using head sets or ear buds", IPCOM0001307I5D, ip.com, Nov. 2, 2005(11 pages).

"Method and System is Disclosed for Modifying Audio Channel Routing Based on Operational Condition Associated El with One or More Audio Devices." Jul. 16, 2010 (3 pages).

Hisahiro Moriuchi"Universal Earphones: Earphones with Automatic Side and Shared Use Detection", 2012, 1 page.

"Automated Play/Pause of Music Based on Aggregated Sensor Data," Feb. 2, 2012 (3 pages).

Free on iPhone: Free Apps, Review for iPhone, "iPhone Proximity Sensor", posted Jan. 2, 2009, retrieved Sep. 1, 2011.

* cited by examiner

ELECTRONIC DEVICES AND ACCESSORIES WITH MEDIA STREAMING CONTROL FEATURES

This application is a division of U.S. patent application Ser. No. 13/689,617, filed Nov. 29, 2012, which is hereby incorporated by reference herein in its entirety. This application claims the benefit of and claims priority to U.S. patent application Ser. No. 13/689,617, filed Nov. 29, 2012.

BACKGROUND

This relates to electronic devices and, more particularly, to electronic devices with accessories such as earphones.

Accessories such as earphones are often used with media players, cellular telephones, computers, and other electronic devices. There can be difficulties associated with using earphones. For example, a user who is using earphones to listen to streaming audio content provided by an online service may occasionally need to remove the earphones. When doing so, the user may miss content that is being played. For example, a user may not be able to manually stop audio content before removing the earphones, causing some of the content to be played without the user's full attention. Playing streaming audio content while the user is not listening is not only wasteful of the electronic device's battery life but also wasteful of cellular data usage, of which the user may only be allotted a certain amount per month.

This type of situation is also undesirable for online service providers, which are typically required to pay for each song played (regardless of whether or not a user is listening).

It would therefore be desirable to be able to provide improved ways in which to control operation of an electronic device coupled to an accessory.

SUMMARY

An electronic device may receive audio content from an online service provider such as an internet radio service or other online service provider. The electronic device may play the audio content for a user through a pair of earphones.

The earphones may have sensor structures that determine whether or not the ears of a user are present in the vicinity of the earphones.

Control circuitry in the electronic device may monitor the sensor structures to determine whether the earphones are in or on the ears of the user. In response to determining that the earphones have been removed from the ears of the user, the control circuitry may communicate with the online service provider.

Communicating with the online service provider may include sending media streaming control commands to the online service provider. The media streaming control commands may include a media streaming pause command that instructs the online service provider to pause the streaming audio content in response to the earphones being removed from the ears of the user.

The audio content provided by the online service provider may include an audio advertisement. The control circuitry may send information to the online service provider indicating that the earphones have been removed from the ears of the user during the audio advertisement.

The electronic device may communicate with computing equipment associated with the online service provider over a communications network such as the internet.

Further features of the invention, its nature and various advantages will be more apparent from the accompanying drawings and the following detailed description of the preferred embodiments.

DETAILED DESCRIPTION

Electronic device accessories may be provided with the ability to sense the presence of external objects. For example, an earphone accessory may be provided with sensing structures such as user detection sensors that can determine whether or not the earphones (i.e., the earphone speakers) are located in or on the ears of a user.

Information gathered by the sensor structures may be used to control audio content that is provided to the user through the earphones. For example, information gathered by the sensor structures may be used to control audio content provided by online services such as internet radio and other streaming content providers. Controlling the playback of streaming content from an electronic device based on whether or not the user is wearing earphones associated with the electronic device may optimize the electronic device's battery life, may optimize the electronic device's cellular data usage, and may also prove beneficial for the online service provider by reducing the amount of content played without a user listening.

Figure 1:
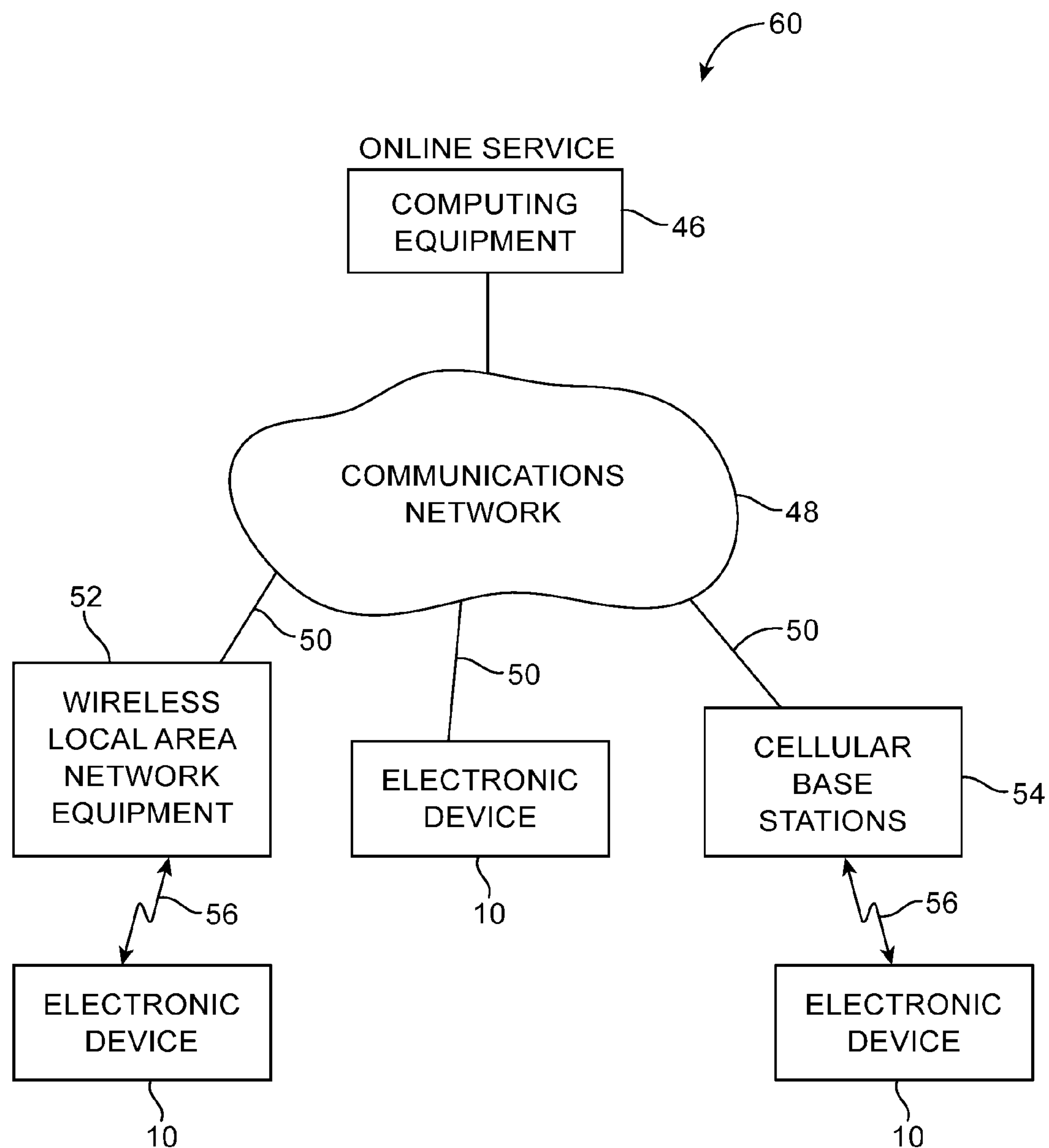
FIG. 1 is a diagram of an illustrative system in which an electronic device with wireless communications circuitry may communicate with an online service provider in accordance with an embodiment of the present invention.

An illustrative system in which an electronic device may communicate with an online service provider such as an online streaming content provider is shown in FIG. 1. As shown in FIG. 1, system 60 may include a communications network such as network 48. Communications network 48 may include wired and wireless local area networks and wide area networks (e.g., the internet). Equipment such as computing equipment 46 may be used in implementing online services. Computing equipment 46 may include one or more networked computers (e.g., servers) on which software is run to implement software-based services. The services that are hosted using computing equipment such as computing equipment 46 may include video server services, audio server services, web page services, communications services, media playback services, online storage services, social networking services, games, etc. Online service computing equipment 46 may, for example, include a streaming content provider such as an internet radio service or other streaming content provider). The servers that are used in implanting online services may be implemented using one or more computers that are located at one or more different geographic locations.

Electronic devices 10 may communicate with online service computing equipment 46 over communications network 48. In a typical wired connection arrangement, an electronic device may be connected to network 48 using a cable. The cable may connect the electronic device to equipment in network 48. For example, link such as link 50 of FIG. 1 may be used to interconnect an electronic device to network 48 (e.g., using a modem). Wireless links may also be formed as part of links 50 or other links in system 60.

For example, an electronic device may have a wireless local area network adapter that allows the device to communicate wirelessly with wireless local area network equipment such as wireless local area network equipment 52. Wireless local area network equipment 52 may, for example, be a router or access point that supports IEEE 802.11 communications (sometimes referred to as WiFi®). As illustrated in FIG. 1, one or more electronic devices 10 may be connected to the network by forming a local wireless link such as one of links 56 with equipment 52.

In addition to forming local wireless links, electronic devices 10 may form remote wireless links (i.e., links that may cover distances of a mile or more). Links of this type may be made, for example, with cellular telephone base stations such as cellular telephone base stations 54. In the example of FIG. 1, one of cellular base stations 54 is shown as forming a remote wireless communications link 56 with an associated one of electronic devices 10.

Wireless local area network equipment 52 and cellular base stations 54 may be connected to other equipment in network 48 using wired or wireless links (shown as links 50 in FIG. 1). Because wireless local area network equipment 52 and cellular base stations 54 serve to provide access to network 48, equipment 52 and cellular base stations 54 may serve as part of communications network 48 and are sometimes referred to as forming wireless network equipment. Other wireless equipment may also be used in network 48 and in forming wireless connections to network 48. The example of FIG. 1 is merely illustrative.

Figure 2:
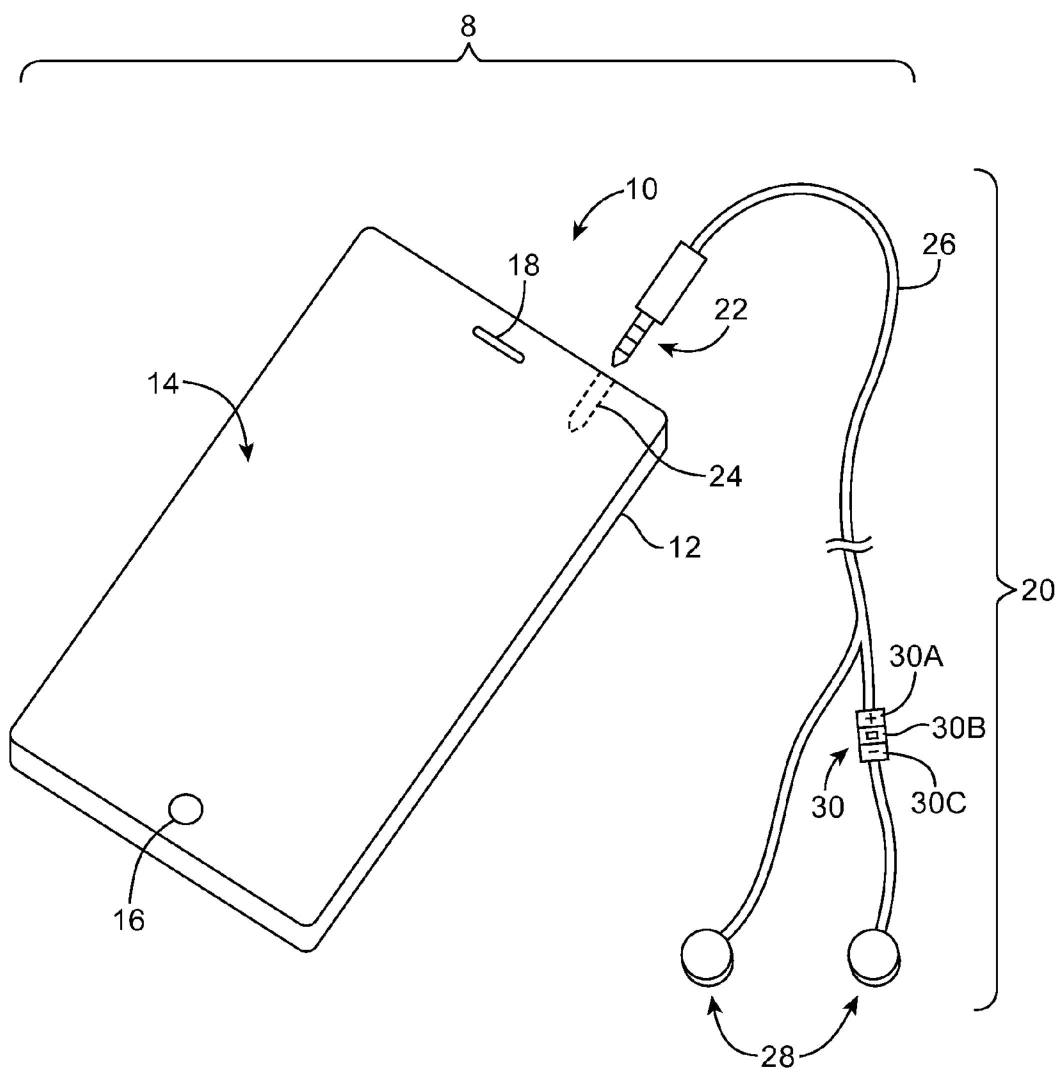
FIG. 2 is a front perspective view of an illustrative electronic device and associated accessory in accordance with an embodiment of the present invention.

A perspective view of a system of the type that may be used in system 60 is shown in FIG. 2. As shown in FIG. 2, system 8 may include electronic device 10 and accessory 20. Device 10 of FIG. 2 may be portable electronic equipment such as a cellular telephone, a tablet computer, a media player, a wrist-watch device, a pendant device, an earpiece device, a notebook computer, other compact portable devices, or other electronic equipment such as a computer monitor with an integrated computer, a computer monitor, a desktop computer, a set-top box, or a television.

Electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Configurations in which display 14 includes display layers that form liquid crystal display (LCD) pixels may sometimes be described herein as an example. This is, however, merely illustrative. Display 14 may include display pixels formed using any suitable type of display technology.

Display 14 may be protected using a display cover layer such as a layer of transparent glass or clear plastic. Openings may be formed in the display cover layer. For example, an opening may be formed in the display cover layer to accommodate a button such as button 16 and an opening such as opening 18 may be used to form a speaker port.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.). The periphery of housing 12 may, if desired, include walls. One or more openings may be formed in housing 12 to accommodate connector ports, buttons, and other components. For example, an opening may be formed in the wall of housing 12 to accommodate audio connector 24 and other connectors (e.g., digital data port connectors, etc.). Audio connector 24 may be a female audio connector (sometimes referred to as an audio jack) that has two pins (contacts), three pins, four pins, or more than four pins (as examples). Audio connector 24 may mate with male audio connector 22 (sometimes referred to as an audio plug) in accessory 20.

Accessory 20 may be a pair of earphones (e.g., earbuds or earphones with other types of speakers), other audio equipment (e.g., an audio device with a single earphone unit), or other electronic equipment that communicates with electronic device 10. The use of a pair of earphones in system 8 is sometimes described herein as an example. This is, however, merely illustrative. Accessory 10 may be implemented using any suitable electronic equipment.

It should be understood that the term "earphones" may refer to any suitable type of audio headset (e.g., headphones, over-the-ear headphones, earbuds, earbud-type headphones with ear hooks, in-ear headphones that extend partially into the ear canal, etc.).

As shown in FIG. 2, accessory 20 may include a communications path such as cable 26 that is coupled to audio plug 22. Cable 26 may contain conductive lines (e.g., wires) that are coupled to respective contacts (pins) in audio connector 22. The conductive lines of cable 26 may be used to route audio signals from device 10 to speakers in earphone units 28. Earphone units 28 (which may sometimes be referred to as speakers, speaker housings, or earphone housings) may include sensor structures for determining when earphone units 28 have been placed within the ears of a user. Microphone signals may be gathered using a microphone mounted in controller unit 30. Controller unit 30 may also have buttons that receive user input from a user of system 8. A user may, for example, manually control the playback of media by pressing button 30A to play media or increase audio volume, by pressing button 30B to pause or stop media playback, and by pressing button 30C to reverse media playback or decrease audio volume (as examples).

The circuitry of controller 30 may communicate with the circuitry of device 10 using the wires or other conductive paths in cable 26 (e.g., using digital and/or analog communications signals). The paths in cable 26 may also be coupled to speaker drivers in earphones 28, so that audio signals from device 10 may be played through the speakers in speaker housings 28. Electronic device 10 may regulate the volume of sound produced by earphones 20 by controlling the audio signal strength used in driving the speakers in speaker housings 28.

Sensor signals from sensor structures in earphones 20 may be conveyed to device 10 using the conductive paths of cable 26. Electronic device 10 may process the sensor signals and take suitable action based on a determination of whether or not earphones 20 are in or on the ears of a user.

Figure 3:
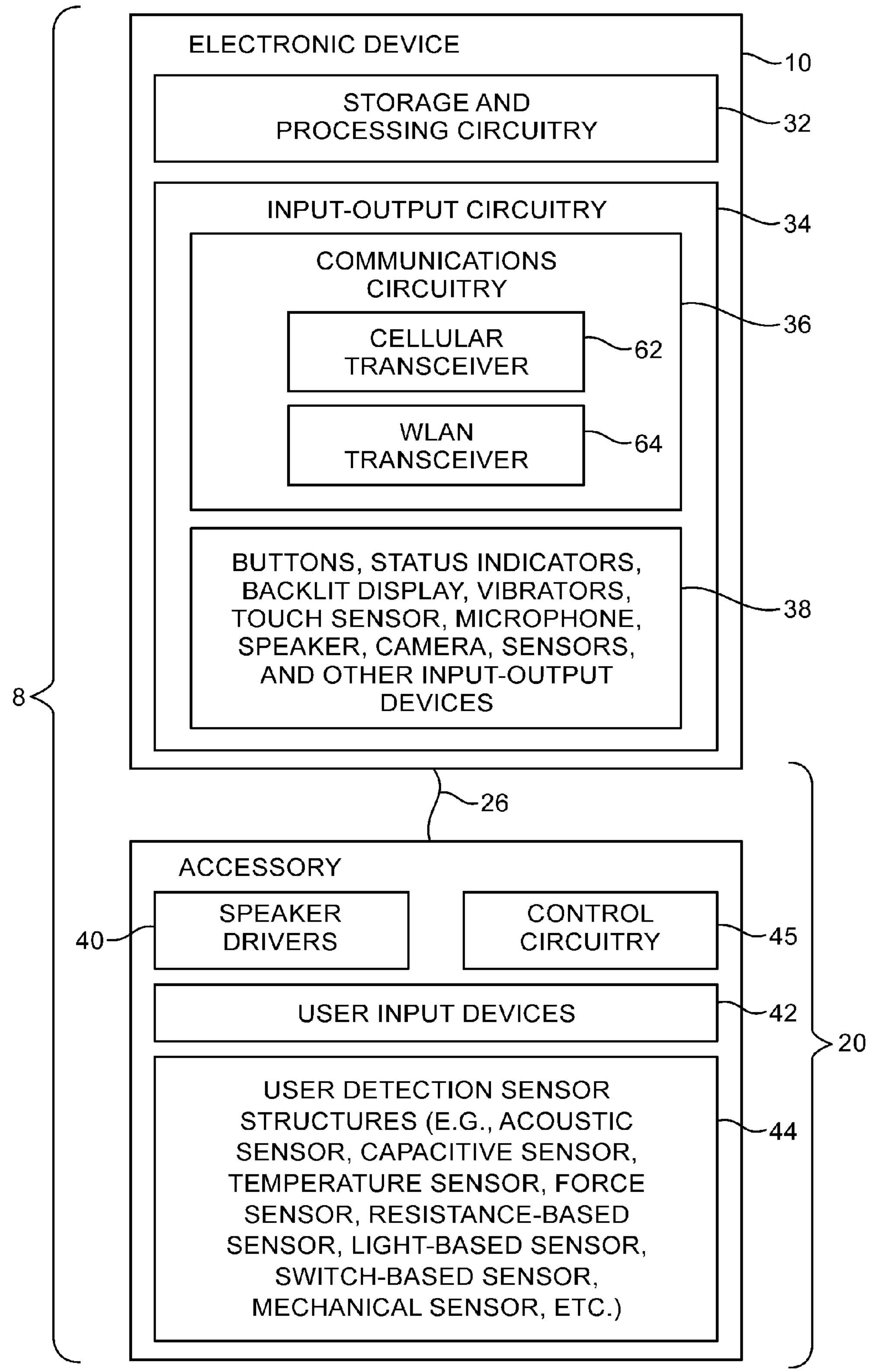
FIG. 3 is a schematic diagram of an illustrative electronic device and associated accessory in accordance with an embodiment of the present invention.

A schematic diagram showing illustrative components that may be used in device 10 and accessory 20 of system 8 is shown in FIG. 3. As shown in FIG. 3, electronic device 10 may include control circuitry 32 and input-output circuitry 34. Control circuitry 32 may include storage and processing circuitry that is configured to execute software that controls the operation of device 10. Control circuitry 32 may be implemented using one or more integrated circuits such as microprocessors, application-specific integrated circuits, memory, and other storage and processing circuitry.

Input-output circuitry 34 may include components for receiving input from external equipment and for supplying output. For example, input-output circuitry 34 may include user interface components for providing a user of device 10 with output and for gathering input from a user.

As shown in FIG. 3, input-output circuitry 34 may include communications circuitry 36. Communications circuitry 36 may be used to form local and remote wireless links such as links 56 of FIG. 1. Local wireless links may be formed using wireless local area network transceiver 64 (e.g., IEEE 802.11 and Bluetooth™. Remote wireless links may be formed using cellular telephone transceiver 62. Communications circuitry 36 may be used to handle wireless signals in communications bands such as the 2.4 GHz and 5 GHz WiFi®) bands, cellular telephone bands, and other wireless communications frequencies of interest. Communications circuitry 36 may also include wired communications circuitry such as circuitry for communicating with external equipment over serial and/or parallel digital data paths.

Input-output devices 38 may include buttons such as sliding switches, push buttons, menu buttons, buttons based on dome switches, keys on a keypad or keyboard, or other switch-based structures. Input-output devices 38 may also include status indicator lights, vibrators, display touch sensors, speakers, microphones, camera sensors, ambient light sensors, proximity sensors, and other input-output structures.

Electronic device 10 may be coupled to components in accessory 20 using cables such as cable 26 of accessory 20. Accessory 20 may include speakers such as a pair of speaker drivers 40 (e.g., a left speaker and a right speaker). If desired, accessory 20 may include more than one driver per speaker housing 28. For example, each speaker housing 28 in accessory 20 may have a tweeter, a midrange driver, and a bass driver (as an example). Speaker drivers 40 may be mounted in earbuds or other speaker housings. The use of left and right speaker housings to house respective left and right speaker drivers 40 is sometimes described herein as an example.

If desired, accessory 20 may include user input devices 42 such as buttons (see, e.g., the buttons associated with button controller 30 of FIG. 2), touch-based input devices (e.g., touch screens, touch pads, touch buttons), a microphone to gather voice input, and other user input devices.

To determine whether or not the speaker housings in which speaker drivers 40 have been mounted are located in or on the ears of a user, accessory 20 may be provided with user detection sensor structures 44. User detection sensor structures 44 may be configured to detect whether or not earphones 20 have been placed in or on the ears of a user. User detection sensors 44 may be formed from acoustic-based sensors such as ultrasonic acoustic-based sensors, from capacitive sensors, from temperature sensors, from force sensors, from resistance-based sensors, from light-based sensors, and/or from switch-based sensors or other mechanical sensors (as examples). Control circuitry 45 in accessory 20 (e.g., storage and processing circuits formed from one or more integrated circuits or other circuitry) and/or control circuitry 32 of electronic device 10 may use information from sensor structures 44 in determining which actions should be automatically taken by device 10.

In force-based sensor schemes, the resistance of a compressible foam may be measured or a strain gauge output can be monitored. When force is present, electronic device 10 can conclude that earphones 20 have been inserted into or mounted on a user's ears, whereas when force is not present, electronic device 10 can conclude that earphones 20 are not being worn by the user. Force indicative of a user's ear pressing against earphones 20 may also be monitored using piezo-electric force sensors or other force sensors.

Figure 4:
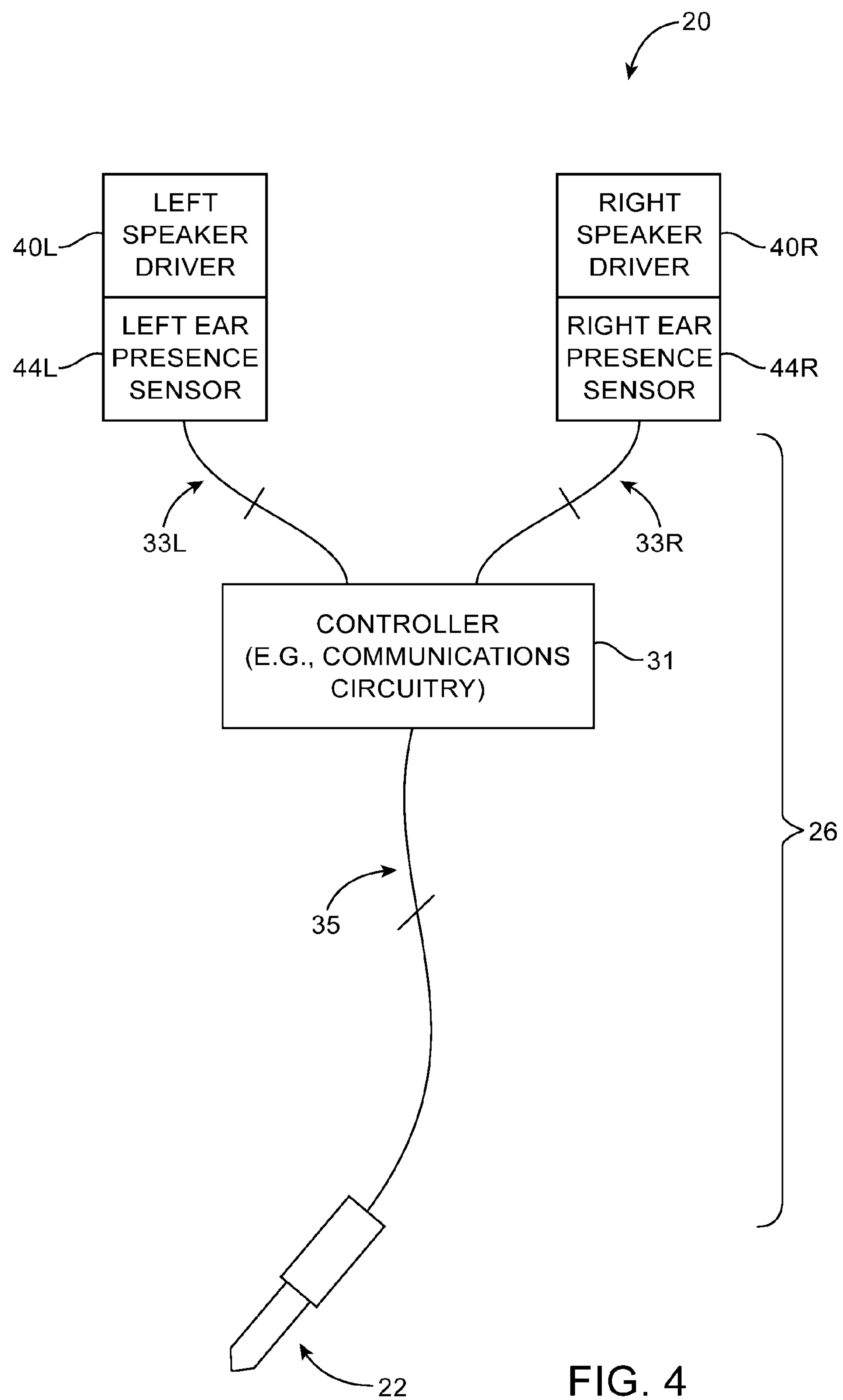
FIG. 4 is a diagram of an illustrative accessory showing how sensor signals may be conveyed from ear presence sensor structures in the accessory to an audio connector in the accessory in accordance with an embodiment of the present invention.

A diagram of accessory 20 illustrating how sensor signals may be conveyed from ear presence sensor structures 44 to an electronic device such as device 10 is shown in FIG. 4. As shown in FIG. 4, accessory 20 may include left speaker driver 40L with associated left ear presence sensor 44L and right speaker driver 40R with associated right ear presence sensor 44R. If desired, only one of speaker drivers 40L and 40R may have an associated ear presence sensor. The example of FIG. 4 in which both left and right speaker drivers have an associated ear presence sensor is merely illustrative.

Cable 26 may include common cable segment 35 that branches into two cable segments 33L and 33R. Cable segments 33L, 33R, and 35 may each include any suitable number of wires. For example, cable segment 33L may include a first wire associated with left channel audio and a second wire that serves as ground. Cable segment 33R may include a first wire associated right channel audio and a second wire that serves as ground. Cable segment 35 may, for example, include a first wire associated with left channel audio, a second wire associated with right channel audio, a third wire that serves as ground, and a fourth wire associated with microphone signals (e.g., microphone signals from a voice microphone in controller unit 30 of FIG. 2).

If desired, there may be additional wires in cable 26. For example, segment 33L may include a wire associated with sensor signals from left ear presence sensor 44L and segment 33R may include a wire associated with sensor signals from right ear presence sensor 44R.

If desired, sensor signals from ear presence sensors 44 may be conveyed over the electrical paths used for analog audio. For example, sensor signals may encoded as digital signals using a modulation scheme (e.g., amplitude modulation, frequency modulation, phase modulation, other suitable modulation techniques, etc.). With this type of configuration, accessory 20 may include a controller such as controller 31 having communications circuitry configured to receive sensor signals from ear presence sensors 44 and to modulate the sensor signals on the existing audio paths in cable segment 35. For example, circuitry 31 may receive sensor signals from sensor 44L and 44R and may modulate the sensor signals on a right channel audio wire, a left channel audio wire, and/or a microphone wire (as examples).

Audio connector 22 may have any suitable number of contacts. For example, connector 22 may be a three-contact audio connector (sometimes referred to as a tip-ring-sleeve (TRS) connector) or connector 22 may be a four-contact audio connector (sometimes referred to as a tip-ring-ring-sleeve (TRRS) connector). In configurations where cable 26 includes a designated wire for sensor signals from ear presence sensors 44, connector 22 may include an additional contact to be used for handling the sensor signals. In configurations where sensor signals are modulated on existing audio wires, connector 22 need not include additional contacts for handling sensor signals.

Figure 5:
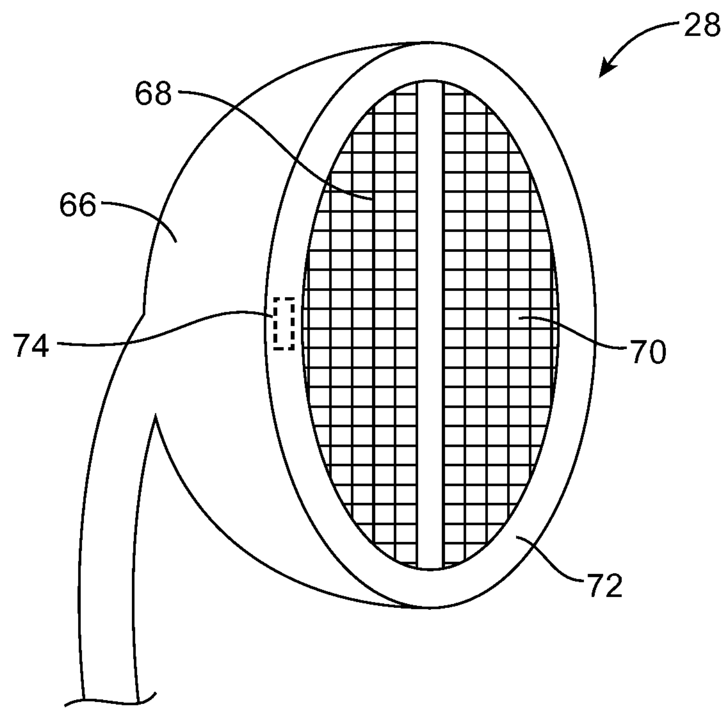
FIG. 5 is a perspective view of an illustrative speaker housing such as an earbud speaker housing that has ear presence sensor structures in accordance with an embodiment of the present invention.

An illustrative earbud speaker housing with an ear presence sensor is shown in FIG. 5. In the example of FIG. 5, earbud 28 has a housing such as housing 66 in which one or more speaker drivers such as speakers 40 of FIG. 3 are mounted.

Conductive structures such as conductive mesh structures 68 and 70 may be mounted in housing 66. As shown in FIG. 5, for example, mesh structures 68 and 70 may be mounted in the front of housing 66 so that sound from the speakers inside earbud housing 66 may pass through the holes of the mesh. If desired, earbud 28 may contain microphone structures (e.g., when implementing noise cancellation features in earbud 28). The use of mesh when forming electrode structures 68 and 70 may allow ambient sound to be picked up by the noise cancellation microphones in housing 66.

Mesh electrodes 68 and 70 (e.g., metal screen structures) or other conductive structures in earbud 28 may be used as first and second terminals in a resistive (resistance-based) sensor. Control circuitry in housing 66 may be used to apply a voltage across the first and second terminals while measuring how much current flows as a result. The control circuitry may use information on the voltage and current signals that are established between electrodes 68 and 70 to determine whether or not earbud 28 has been placed in the ear of a user. In the absence of the user's ear, the resistance between electrodes 68 and 70 will be relatively high. When, however, earbud 28 has been placed into a user's ear, contact between electrodes 68 and 70 and the flesh of the ear will give rise to a lower resistance path between electrodes 68 and 70. To determine whether or not earbud 28 has been placed within the user's ear, the control circuitry of earbud 28 (and/or control circuitry 32 of FIG. 3) may measure the resistance between electrodes 68 and 70 and may compare the measured resistance to a predetermined threshold. When the measured resistance is below the predetermined threshold, device 10 can conclude that earbud 28 has been placed in the ear of the user. When the measured resistance exceeds the predetermined threshold, device 10 can conclude that earbud 28 is out of the ear.

In addition to or instead of using mesh 68 and 70 to measure the resistance of the user's ear, mesh electrodes 68 and 70 may be used as capacitive sensor electrodes (e.g., to make mutual capacitance measurements or to make self capacitance measurements). Different capacitance values may be detected in the presence and absence of the user's ear in the vicinity of electrodes 68 and 70. This allows device 10 to use the capacitance measurements to determine whether or not earbud 28 is in, on, or out of the user's ear.

If desired, earbud 28 may include a sealing member such as sealing member 72. Sealing member 72 may be used to form a seal between user's ear and earbud 28 that helps block ambient noise while also forming an enclosed cavity adjacent to the ear canal. In addition to or instead of using mesh 68 and 70 to detect the presence of a user's ear, an ear presence sensor such as ear presence sensor 74 may be embedded in or formed on sealing member 72.

As an example, ear presence sensor 74 may be a temperature sensor configured to measure a temperature adjacent to sealing member 72. Different temperature values may be detected in the presence and absence of the user's ear in the vicinity of sealing member 72. Device 10 may use temperature information provided by temperature sensor 74 to determine whether or not earbud 28 is in, on, or out of the user's ear.

As an additional example, ear presence sensor 74 may be a pressure or force sensor configured to measure a pressure or force against sealing member 72. Different pressure or force values may be detected in the presence and absence of the user's ear in the vicinity of sealing member 72. Device 10 may use information provided by sensor 74 to determine whether or not earbud 28 is in, on, or out of the user's ear.

These examples are, however, merely illustrative. If desired, sensor 74 may be a capacitive sensor, a switch-based sensor (e.g., sensor 74 may be a mechanical switch that is actuated when a user's ear is present or absent), or any other suitable type of sensor configured to detect the presence and/or absence of a user's ear.

Figure 6:
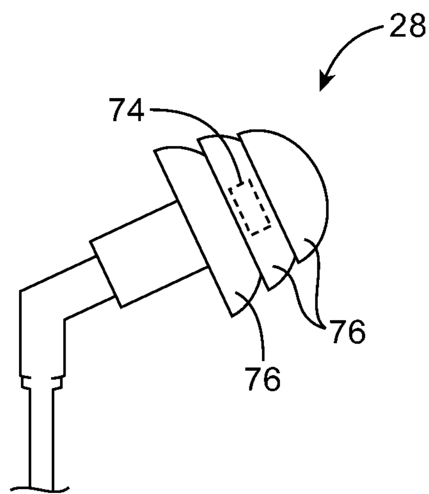
FIG. 6 is a perspective view of an illustrative speaker housing such as an in-ear speaker housing that has ear presence sensor structures in accordance with an embodiment of the present invention.

FIG. 6 is a perspective view of an illustrative in-ear speaker housing with an ear presence sensor. In the example of FIG. 6, in-ear earbud 28 includes sealing members 76 configured to extend partially into the ear canal of a user's ear. Earphones of the type shown in FIG. 6 are sometimes referred to as ear-canal headphones.

As shown in FIG. 6, ear presence sensor 74 may be embedded in or formed on one of sealing members 76. Ear presence sensor 74 may be a temperature sensor, a pressure or force sensor, a capacitive sensor, a switch-based sensor (e.g., sensor 74 may be a mechanical switch that is actuated when earbud 28 is inserted or removed from a user's ear), or any other suitable type of sensor configured to detect the presence and/or absence of a user's ear.

Figure 7:
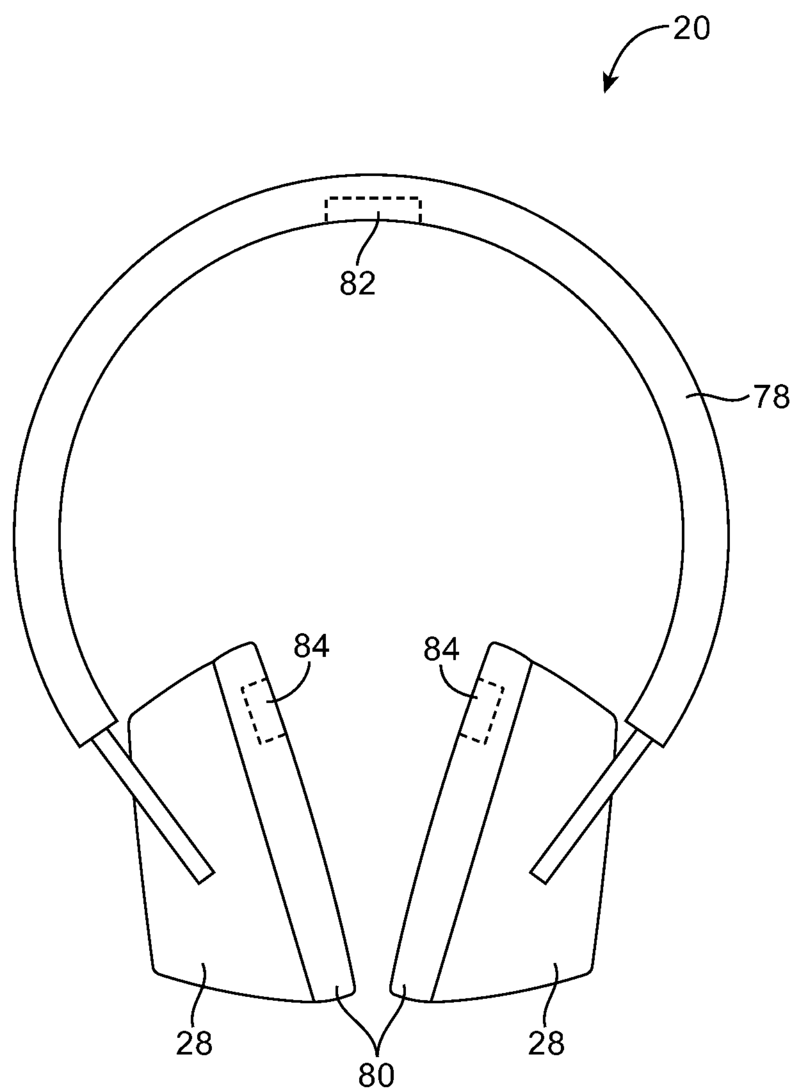
FIG. 7 is a perspective view of illustrative earphones such as over-the-ear headphones that have ear presence sensor structures in accordance with an embodiment of the present invention.

FIG. 7 is a perspective view of illustrative over-the-ear headphones having one or more user detection sensors. In the example of FIG. 7, accessory 20 includes a headband such as headband 78 with left and right over-the-ear speaker housings 28. A sealing member such as sealing member 80 may be a ring or layer of foam or may be any other suitable type of ear pad configured to form a seal around the user's ear to block out ambient noise.

As shown in FIG. 7, accessory 20 may include one or more user detection sensors such as user detection sensors 82 and 84. User detection sensors 84 may be embedded in or formed on sealing members 80 and may be configured to detect the presence and absence of a user's ears in the vicinity of speaker housings 28. User detection sensor 82 may be embedded in or formed on headband portion 78 and may be configured to detect the presence and absence of a user's head adjacent to headband 78. When information from sensor 82 indicates that a user's head is not present, device 10 can conclude that the user is not wearing headphones 20. When information from sensor 82 indicates that a user's head is present, device 10 can conclude that the user is wearing headphones 20.

User detection sensors 82 and 84 may be temperature sensors, pressure or force sensors, capacitive sensors, acoustic-based sensors, switch-based sensors (e.g., sensors formed form mechanical switches that are actuated when a user's ear or head is present or absent), or any other suitable type of sensor configured to detect the presence and/or absence of a user's ear.

Figure 8:
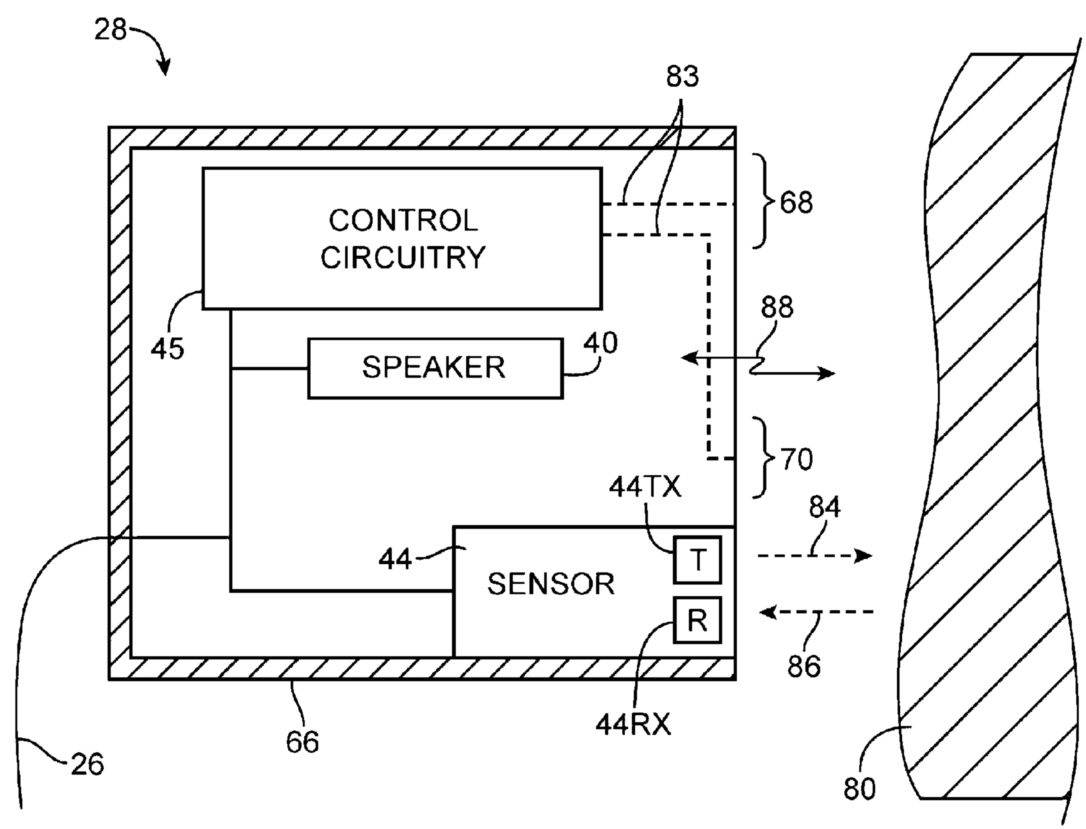
FIG. 8 is a cross-sectional side view of an earphone housing of the type that may be provided with sensor structures for detecting the presence of an ear or other external object in accordance with an embodiment of the present invention.

A cross-sectional side view of an illustrative earbud with a speaker driver and an associated ear presence sensor is shown in FIG. 8. As shown in FIG. 8, earbud 28 may have a housing such as housing 66. Speaker 40 may be mounted within housing 66 overlapping an acoustic grill formed from structures such as mesh 68 and 70 or other acoustic mesh. During operation, sound 88 may pass through the acoustic mesh. For example, speaker 40 may produce sound that is received by a user's ear or other external object 80.

When external object 80 is sufficiently close to earbud 28, the presence of external object 80 may be detected. For example, control circuitry 45 (or control circuitry 32 in device 10) may measure the resistance between mesh electrodes 68 and 70 using conductive paths 83 or may use capacitance measurements in monitoring for the presence of object 80. The measured resistance (or capacitance) may then be used to determine whether earbud 28 is in the user's ear or is out of the user's ear. Control circuitry 45 (or control circuitry 32 in device 10) may also use sensors such as sensor 44 of FIG. 8 to monitor for the presence or absence of external objects such as the user's ear. As shown in FIG. 8, sensor 44 may have a transmitter such as transmitter 44TX and may have a receiver such as receiver 44RX. During operation of sensor 44, sensor 44 may transmit signals such as signal 84 and may gather reflected signals such as signal 86. The strength of received signal 86 may be used to measure whether or not external object 80 is in the presence of earbud 28.

Sensor 44 may, for example, be a sensor that emits and receives acoustic signals. For example, transmitter 44TX may be a signal transducer that transmits acoustic signals 84. Receiver 44RX may be a signal receiver that measures the amount or quality of acoustic signal 84 that is reflected as reflected signal 86 from external object 80. When the amount or quality of acoustic signal that is reflected from external object 80 is low or fits a specific profile, circuitry 45 can conclude that earbud 28 is not in the user's ear. When the amount or quality of acoustic signal that is reflected from external object 80 is high or fits a specific profile, circuitry 45 can conclude that earbud 28 is currently in the user's ear.

Signal transducer 44TX may be configured to transmit ultrasonic signals and/or acoustic signals in the audible range. Signal transducer 44TX may, for example, transmit ultrasonic signals during audio playback (e.g., while speaker driver 40 is playing audio content for a user), whereas acoustic signals in the audible range may be transmitted when audio content is not being played by speaker driver 40 (e.g., between songs).

If desired, signal receiver 44RX may be used to receive acoustic signals that have been transmitted by speaker driver 40 and reflected from external object 80. With this type of configuration, signal transmitter 44TX may not be required. The echo of the audio content transmitted by speaker driver 40 and received by receiver 44RX may be indicative of whether or not earbud 28 is present at the user's ear.

Device 10 may use information from sensor structures 44 (FIG. 3) to control audio content that is provided to the user through the earphones. For example, device 10 may control content from an online service provider (e.g., online service computing equipment 46 of FIG. 1) based on whether or not earphones 20 are being worn by a user. Device 10 may communicate with the online service provider in response to receiving information from sensor structures 44. When information from sensor structures 44 indicates that earphones 20 are not in or on a user's ears, device 10 may pause, stop, or mute content playback, may lower the playback volume (i.e., audio signal drive strength), may close the application providing the content, and/or may take other suitable actions.

If desired, information gathered by user detection sensors 44 may be provided to the online service that is providing the audio content. For example, device 10 may send user data to the online content provider indicating when a user removes earphones 20 while listening to content provided by the online content provider (e.g., during an advertisement, during a particular song, etc.). This type of information may allow the online service provider to optimize the services and advertisements it provides to the user.

Figure 9:
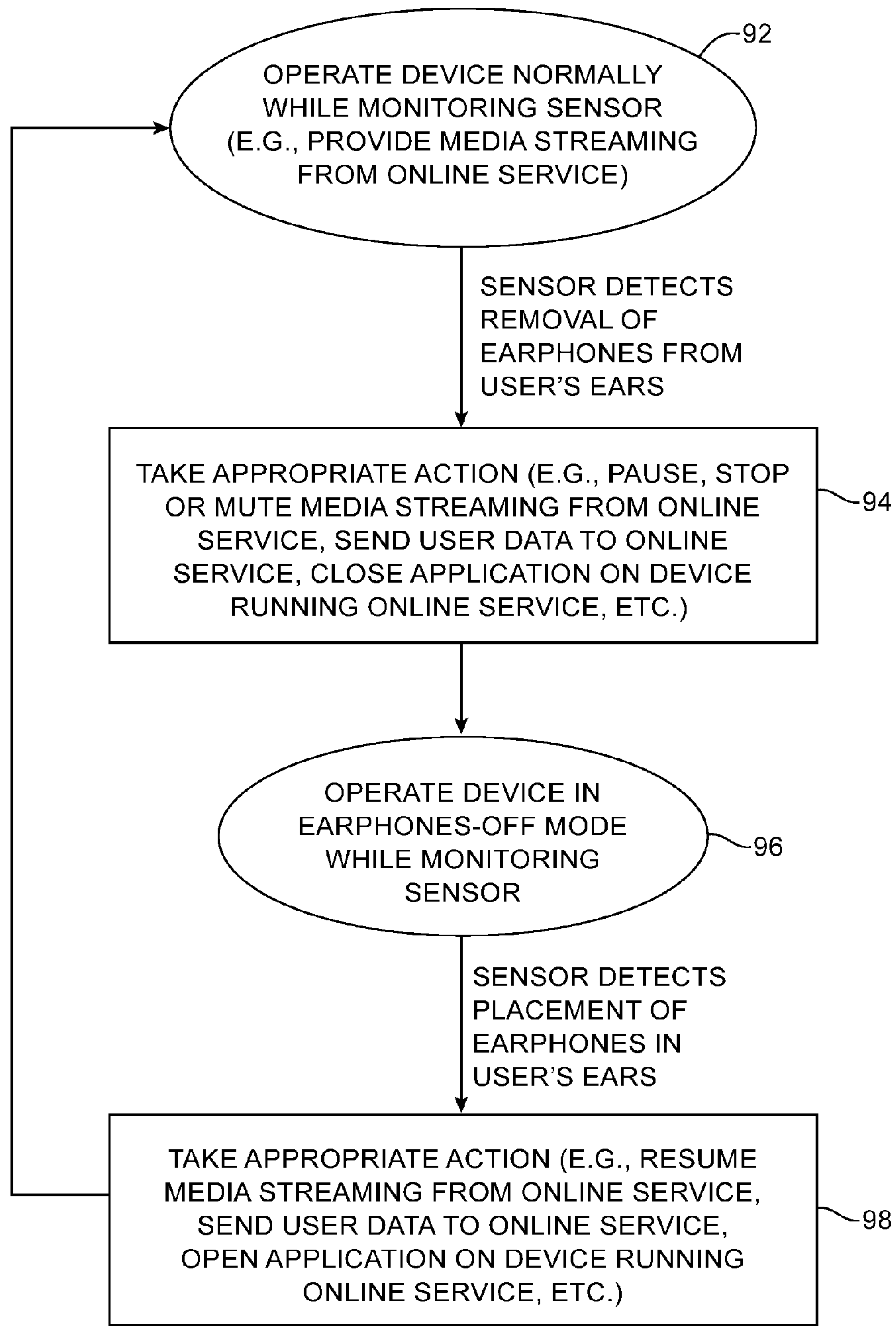
FIG. 9 is a flow chart of illustrative steps involved in using an accessory and electronic device in accordance with an embodiment of the present invention.

A flow chart of illustrative steps involved in in using system 8 is shown in FIG. 9. During the operations of step 92, earphones 20 may be located in or on the ears of a user and device 10 may be operated normally while using sensor circuitry 44 to monitor for the presence or absence of speaker housings 28 of accessory 20 in or on the ears of a user. In configurations where earphones 20 are over-the-ear headphones (FIG. 7), sensor circuitry 44 may be used to monitor the presence or absence of the user's head near headband 78 or the presence or absence of the user's ears near over-the-ear speaker housings 28. Circuitry 32 (and/or circuitry 45, if desired) may be used in evaluating sensor data and taking appropriate action. Configurations in which control circuitry 32 is used in taking action based on sensor data are sometimes described herein as an example.

Examples of operations that may be performed by device 10 during step 92 include audio-based operations such as playing media content using an audio signal strength that results in a playback volume that is appropriate for listening through earphones 20, providing a user with audio associated with a telephone call, providing audio associated with a video chat session to the user, or otherwise presenting audio content through earphones 20. Audio may be played in stereo so that left and right earbuds receive corresponding left and right channels of audio, may be played using a multi-channel surround sound scheme, or may be played using a monophonic (mono) sound scheme in which both the left and right channels of audio are identical.

The media content may be media content that is stored locally on electronic device 10 or may be streaming media content that is provided by an online service (e.g., an online radio service or other internet-based content provider such as online service computing equipment 46 of FIG. 1). For example, electronic device 10 may receive streaming audio content from computing equipment associated with an online service provider over a communications network.

During the monitoring operation of step 92, device 10 can use user detection sensors 44 to determine whether or not earphones 20 are in or on the user's ears.

If, during the operations of step 92, it is determined that earphones 20 have been removed from the user's ears, device 10 may take suitable action at step 94. For example, device 10 may communicate with the online service provider in response to determining that the earphones are out of the user's ears. Communicating with the online service provider may include sending media streaming control commands to the online service provider. The media streaming control commands may, for example, include a media streaming pause command that instructs the online service provider to pause the audio content that is being transmitted to the electronic device over the communications network. Communicating with the online service provider may also include sending user data to the online service provider indicating that the earphones have been removed from the user's ears during an audio advertisement.

Other suitable actions that may be taken by device 10 in response to the user removing earphones 20 from the user's ears include pausing, stopping, or muting the media playback, adjusting the playback volume (audio signal drive strength), closing the application on device 10 that is running the online service that is providing the media, and/or sending user data to the online service (as examples). User data that may be sent to the online service may include information about when the user removes earphones 20 (e.g., during what type of content the user removes earphones 20, how often the user removes earphones 20, how long the earphones 20 are removed from the user's ears, etc.). For example, electronic device 10 may send user data to the online service provider indicating that the earphones have been removed from the user's ears during an audio advertisement. In configurations where the audio content to which the user is listening is received from the online service over a wireless communications link, step 94 may include terminating the audio content to which the user is listening in response to the earphones being removed from the user's ears.

After taking suitable actions at step 94, device 10 can be operated in an earphones-off mode (step 96). For example, device 10 may operate with paused, stopped, or muted audio playback during step 94. In situations where the actions taken during step 94 included sending user data to the online service without pausing, stopping, muting, or otherwise adjusting the audio content provided by the online service, step 96 may include operating device 10 normally (e.g., continuing to provide audio content from the online service).

During the operations of step 96, ear presence sensor structures 44 may be used to monitor for the presence of earphones 20 in or on the ears of the user.

If, during the operations of step 96, sensor structures 44 determine that earphones 20 have been placed in or on the user's ears, appropriate action may be taken at step 98. Suitable actions that may be taken by device 10 in response to earphones 20 being placed in or on the user's ears include resuming media playback, restoring a previous volume level of the media playback, opening the application on device 10 that runs the online service that provides the media, and/or sending user data to the online service (as examples). Operations may then proceed to step 92, where device 10 may operate in an earphones-on mode while monitoring sensor structures 44 to determine when earphones 20 are removed from the user's ears.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device configured to receive audio content from an online service provider, comprising:

a component configured to transmit audio signals over a communications path to a pair of earphones each having sensor structures that determine whether the earphones are present on the ears of a user, wherein each earphone in the pair comprises a conductive mesh that passes sound produced by speakers in the earphones and that is divided into first and second electrodes, and wherein the sensor structures comprise a resistance-based sensor that detects changes in resistance between the first and second electrodes in each earphone in the pair; and control circuitry configured to:

monitor the sensor structures to gather information on whether the earphones are present on the ears of the user by measuring the changes in resistance between the first electrode and the second electrode in each earphone in the pair; and communicate the information to the online service provider.

2. The electronic device defined in claim 1 further comprising:

cellular transceiver circuitry that receives the audio content from the online service provider.

3. The electronic device defined in claim 1 wherein the online service provider comprises an Internet radio service and wherein the earphones play the audio content from the Internet radio service based on the audio signals.

4. The electronic device defined in claim 1 wherein the audio content comprises streaming audio content and wherein communicating the information to the online service provider comprises sending a pause command that instructs the online service provider to pause the streaming audio content.

5. The electronic device defined in claim 1 wherein the audio content comprises a streaming audio advertisement.

6. The electronic device defined in claim 5 wherein communicating with the online service provider comprises sending user data to the online service provider.

7. The electronic device defined in claim 5 wherein communicating the information to the online service provider comprises communicating information indicating that the user has removed the earphones during the streaming audio advertisement.

8. A method for operating a pair of earphones each having a speaker housing and a resistance-based ear presence sensor structure mounted in the speaker housing, the method comprising:

with speakers in the each of the speaker housings, playing audio content that passes through conductive mesh in each of the speaker housings, wherein the conductive mesh is split into first and second electrodes in each of the resistance-based ear presence sensor structures;

with control circuitry in the earphones, measuring a resistance between the first and second electrodes in each of the resistance-based ear presence structures to determine whether each of the earphones in the pair are present on the ears of a user;

with the control circuitry, comparing the measured resistance to a threshold; and in response to determining that the measured resistance exceeds the threshold, adjusting the audio content that is being played by the speakers.

9. The method defined in claim 8, further comprising:

with the control circuitry, applying a voltage across the first and second electrodes in each of the resistance-based ear presence structures.

10. The method defined in claim 9, wherein measuring the resistance comprises measuring current that flows between the first and second electrodes in each of the resistance-based ear presence structures as a result of the applied voltage.

11. The method defined in claim 8, further comprising:

in response to determining that the measured resistance exceeds the threshold, generating user data that indicates that the earphones are not present on the ears of the user.

12. The method defined in claim 11, wherein the audio content comprises streaming audio content from an online service provider and wherein adjusting the audio content comprises sending a pause command to the online service provider that instructs the online service provider to pause the streaming audio content.

13. The method defined in claim 12, further comprising:

with communications circuitry in an electronic device, receiving the streaming audio content from the online service provider, wherein the electronic device provides the streaming audio content to the earphones; and with the communications circuitry in the electronic device, transmitting the user data to the online service provider, wherein the online service provider pauses the streaming audio content in response to receiving the pause command.

14. An electronic device accessory that receives audio signals from an electronic device over a communications path, the electronic device accessory comprising:

a component configured to form the communications path;

left and right earphone housings;

left and right speaker drivers that receive the audio signals and produce sound based on the audio signals, wherein the left speaker driver is mounted in the left earphone housing and wherein the right speaker driver is mounted in the right earphone housing;

ear presence sensor structures attached to each of the left and right earphone housings, wherein each of the ear presence sensor structures comprises an acoustic grill that is split into first and second conductive mesh electrodes in each of the left and right earphone housings and that passes the sound generated by the left and right speaker drivers, respectively; and control circuitry that measures a resistance between the first and second conductive mesh electrodes in each of the left and right earphone housings to determine whether at least one of the left and right earphone housings is present on the ears of a user.

15. The electronic device accessory defined in claim 14 wherein the control circuitry applies a voltage across the first and second conductive mesh electrodes in each of the left and right earphone housings.

16. The electronic device accessory defined in claim 15, wherein the control circuitry measures the resistance by measuring current that flows between the first and second conductive mesh electrodes in each of the left and right earphone housings as a result of the applied voltage.

17. The electronic device accessory defined in claim 14, wherein the control circuitry compares the resistance to a predetermined threshold to determine whether the earphones are present on the ears of the user, and wherein the audio signals received by the left and right speakers are adjusted in response to determining that the resistance exceeds the predetermined threshold.

18. The electronic device accessory defined in claim 17, wherein the audio signals comprise streaming audio signals from an online service provider, and wherein the online service provider pauses the streaming audio signals in response to the control circuitry determining that the resistance exceeds the predetermined threshold.

* * * * *